(12) United States Patent
Schauermann

(10) Patent No.: US 6,216,320 B1
(45) Date of Patent: Apr. 17, 2001

(54) CABLE HOLDING ARRANGEMENT

(75) Inventor: Dettmar Schauermann, Erbach (DE)

(73) Assignee: Friedrich Lutze Elektro GmbH, Weinstadt (DE)

( * ) Notice: Subject to any disclaimer, the term of this patent is extended or adjusted under 35 U.S.C. 154(b) by 0 days.

(21) Appl. No.: 09/366,921

(22) Filed: Aug. 4, 1999

(30) Foreign Application Priority Data

Sep. 8, 1998 (DE) ............................................. 198 40 959

(51) Int. Cl.⁷ ............................... A44B 21/00; F16L 3/22; F16M 13/00; H02G 3/00
(52) U.S. Cl. ................................. 24/458; 24/457; 24/459; 24/293; 248/68.1
(58) Field of Search ............................. 24/458, 457, 459, 24/293, 289, 295, 294; 411/508, 510; 248/68.1

(56) References Cited

U.S. PATENT DOCUMENTS

| | | | |
|---|---|---|---|
| 3,042,352 | * | 7/1962 | Stamper .............................. 248/68.1 |
| 3,802,654 | * | 4/1974 | Jenko et al. ........................... 248/73 |
| 4,323,378 | * | 4/1982 | Miljoen ................................. 24/458 |
| 4,679,754 | * | 7/1987 | Richards .............................. 24/458 |
| 5,149,026 | * | 9/1992 | Allen ................................... 248/68.1 |
| 5,149,027 | * | 9/1992 | Weber ................................. 24/459 |
| 5,593,115 | * | 1/1997 | Lewis ................................. 248/68.1 |
| 5,922,961 | * | 5/1999 | Viklund et al. ...................... 248/68.1 |

FOREIGN PATENT DOCUMENTS

0221618 * 6/1962 (AT) ....................................... 24/459

* cited by examiner

Primary Examiner—Victor N. Sakran
(74) Attorney, Agent, or Firm—Adams, Schwartz & Evans, P.A.

(57) ABSTRACT

A cable holding arrangement with a holding plate (10) is suggested which has a plurality of similar holding openings (11) arranged next to each other in a row. At least one holding clip (13) has two plug feet (15) connected with one another through a holding area (14) for insertion into two of the holding openings (11). In the inserted condition, the holding clip (13) forms a U-shaped arrangement through which a cable (12) to be secured can be engaged and pressed against the holding plate (10). The plug feet (15) have a stop arrangement (16) locating with the holding openings (11). In this way, cables (12) can be secured in different ways to the holding plate (10) by simple insertion of a holding clip, simple release and shifting also being possible.

20 Claims, 3 Drawing Sheets

CABLE HOLDING ARRANGEMENT

TECHNICAL FIELD AND BACKGROUND OF THE INVENTION

The invention relates to a cable holding arrangement with a holding plate as used in switch cabinets, for example. The cables led in must be secured mechanically in front of their electrical connection points, and there often must also be a ground connection with the cable shielding. To this end, the cable is stripped in a known way in the holding area up to the cable shielding after which there is a fastening to a metal rail by means of a screw terminal or collar.

One of the drawbacks of this conventional fastening means is that screw holes must be drilled to fix the screw terminal or collar, and screw fastening involves a not inconsiderable amount of labor. A subsequent shift in the fastening point is a complicated matter and also entails a major amount of work. Since the cables to be fastened usually have different diameters, different-size screw terminals or collars must be provided. Another drawback is that the minimum space between cables to be fastened is not inconsiderable because of the holding tabs of the screw terminals or collars to be screwed tight so that an often desirable fastening of the cables right to each other is hardly possible.

SUMMARY OF THE INVENTION

The object of the invention is thus to provide a cable holding arrangement that makes cable fastening and loosening possible without considerable mounting effort.

This object is achieved according to the invention by a cable holding arrangement with a holding plate having a plurality of similar holding openings arranged next to each other in a row, with at least one holding clip that has two plug feet connected with each other through a holding area for insertion in two of the holding openings and which forms a U-like arrangement in the plugged-in condition by means of which a cable to be secured can be clasped and pressed onto the holding plate, the plug feet having an arrangement for locating with the holding openings.

The particular advantage of the invented cable holding arrangement is that, to secure the cable, only one holding clip has to be mounted in a way that its two plug feet engage a holding opening on both sides of the cable.

Location and securing of the cable is automatic on insertion. Selection of the cable fastening point can be practically anywhere because of the many holding openings that are arranged next to each other in a row. Depending on the diameter of the cable to be fastened, the holding clip can used in two holding openings arranged next to each other or in two that are spaced farther apart.

Advantageous developments and improvements with respect to the cable holding arrangement indicated in claim 1 are possible with measures that are given in the subordinate claims.

The holding openings are preferably designed as parallel slots in order to ensure a wide and reliable fixing of the suitable shaped plug feet.

The holding clip is preferably designed as a flexibly sprung arrangement, the plug feet to be pressed toward each other for insertion in the two holding openings being spring-mounted in the inserted condition on the most widely separated outer edges or edge areas of the two holding openings.

The holding clip can be disengaged and loosened in a simple way by pressing the two plug feet together. The flexibly sprung arrangement of the holding clip ensures adjustment to cables with different cross-sections.

For reliable location, the two plug feet have stop projections and/or stop recesses pointing in opposite directions designed for locating with the outer edges of two holding openings. The outer edges thus act as counter-locating means for the stop projections and/or stop recesses.

Each plug foot will preferably have at least one row of stop teeth running in the plugging direction so that locating will take place with practically any insertion depth. This helps considerably to make it possible for a single kind of holding clip to be used for quite different cable diameters.

In a further advantageous development, the stop teeth have tooth ramps that facilitate insertion on their side pointing in the direction of insertion and tooth edges that are essentially vertical on the other side. In this way, the holding clips can be pressed against the cable following insertion of the plug feet into two holding openings, which provides in a simple way for clamping and reliable location. Production of the holding clips is especially simple and economical in that they are preferably designed as a one-piece stamped and bent part made of sheet metal.

An even better adjustment to different cable diameters and a more reliable fixing of the clamp is achieved in that a holding spring arrangement, which is flexibly held against the cable to be held when the holding clip is in the inserted condition, is formed on the holding area. The holding spring arrangement is preferably designed as a one-piece metal strip formed on the holding area and extends from one edge of the holding plate along the underside of the holding area pointing in the inserted condition toward the holding plate.

In an alternative advantageous development, the holding area is designed as a tension spring that preferably has a flat shape. This development is especially suitable for cables with very large diameters, the design of the holding plate as a tension spring also achieving very good adjustment to the cross-section of the cable to be fastened. This kind of holding clip can also be used, for example, to secure a number of cables in place together.

In a simple development, the holding plate has a U-shaped cross-section, the holding openings being arranged on the connection cross-piece between the strip-like U-legs. In an improved development, these holding elements are arranged in the middle area of the connection cross-piece, and holding elements with a T-shape in particular are formed on the two side areas. With these holding elements, isolated areas on both sides of the insulated area can also be fastened with holding strips, tapes or wires. To adjust to the reduced cross-section of the cable in the stripped area, the plane of the middle area of the connection cross-piece is preferably displaced relative to the two side areas toward the side facing away from the U-legs, particularly by a value equal to the thickness of the insulation layer so that the cable can be secured linearly.

In a further advantageous development, the holding plate is provided on one side with a with a mount for clamping attachment on a bearing rail or a mounting cross-piece on the opposite side with the holding openings. The mount is preferably designed as a bent over end area of the holding plate.

This kind of holding plate can thus be clamped or located in a very simple and rapid way on an existing bearing rail or an existing mounting cross-piece so that it can be provided later at the required point with this kind of holding plate that can also be displaced.

The mount for clamping location is designed with a stop strip arranged in particular on a U-leg of the bearing rail or of the mounting cross-piece.

This kind of stop strip is often present in any case on conventional bearing rails or mounting cross-pieces.

The holding plate and the at least one holding clip consist at least in part of an electrically conductive material, especially metal, so that a grounding connection with the cable shielding of the cable is established when fastening is carried out by means of the holding clip.

BRIEF DESCRIPTION OF THE DRAWINGS

Example embodiments of the invention are illustrated in the drawing and explained in more detail in the description following. In the drawing.

DESCRIPTION OF THE PREFERRED EMBODIMENT AND BEST MODE

Figure 1:
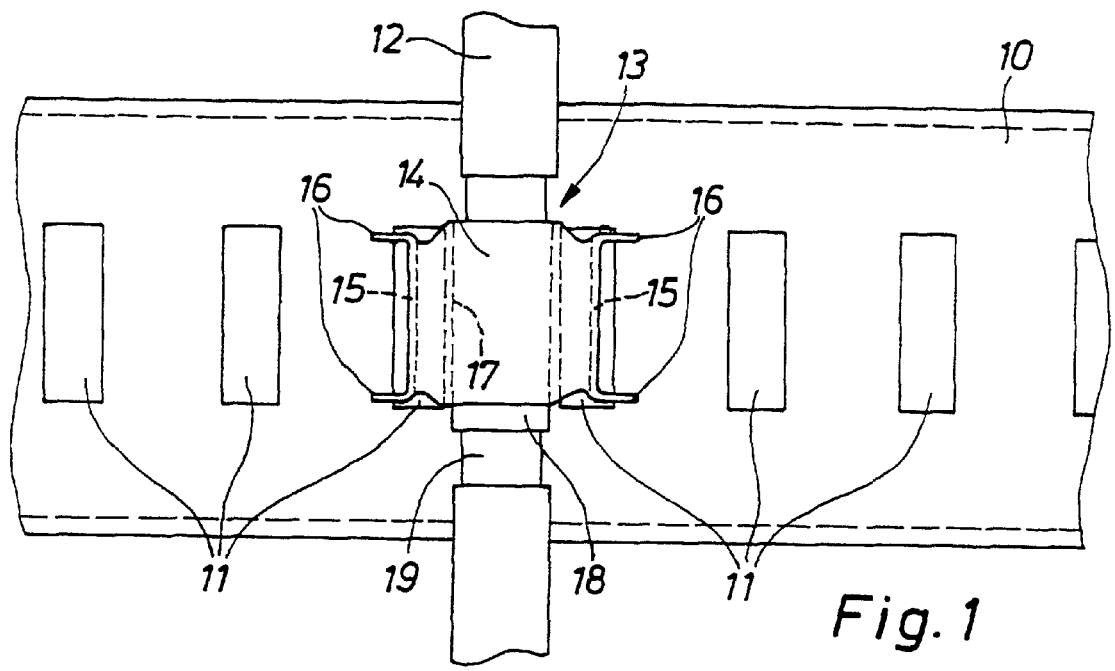
FIG. 1 shows a plan view of a cable fastened to a U-shaped holding plate by means of a holding clip.
Figure 2:
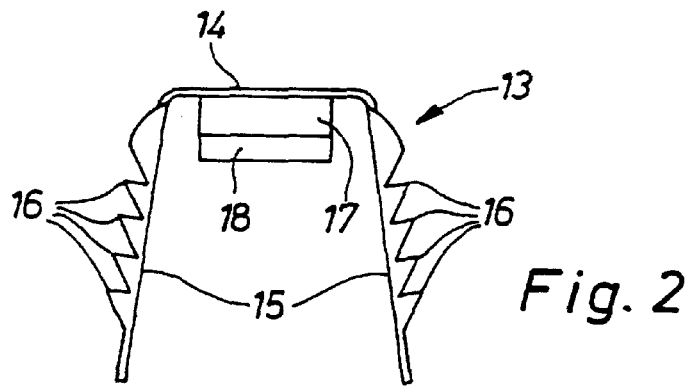
FIG. 2 is a side view of the holding clip illustrated in FIG. 1.

In the first example embodiment shown in FIGS. 1 and 2, a cable holding arrangement comprises a holding plate 10 with U-shaped cross-section that can be cut to any length as a holding rail for cables that can be mounted in a switch cabinet (not shown) or any other switching arrangement, for example, next to a mounting cross-piece for electrical switch units. This U-shaped holding plate is made, for example, of galvanized sheet steel or is designed as an extruded aluminum shape and, in the middle, has a row of parallel, slotted, rectangular and equidistant holding openings 11.

A cable 12 is secured on this holding plate 10 by a holding clip 13, a correspondingly large number of holding clips 13 being needed for fastening a plurality of cables 12. This holding clip 13 is made as a one-piece stamped and bent part from thin and flexible sheet metal. It consists basically of two plug feet 15 connected with each other over a holding area 14, the holding area 14 and the plug feet 15 being formed basically by a bent sheet-metal strip, the width thereof being slightly smaller than the length of the holding openings 11. The two longitudinal edges of the two plug feet 15 each have a row of stop teeth 16, each being bent outwardly and substantially rectangularly with respect to the plane of the plug feet 15, To facilitate the insertion of the plug feet 15 into two holding openings 11, the stop teeth 16 have tooth ramps on their sides inclined in the insertion direction, that is, toward the free end of the plug feet 15, while their other sides have tooth edges arranged substantially vertically with respect to the insertion direction, these tooth edges ensuring reliable location with longitudinal edges of the holding openings 11.

A holding spring 17 made of a strip of sheet metal is formed at the side on the middle holding area and runs below, along and at a distance from the holding area 14, the end area 18 of this holding spring 17 being angled or curved toward the holding area 14. To secure the cable 12, it is placed vertical to the longitudinal direction of the holding plate 10 between two holding openings 11. The plug feet 15 diverging at an angle relative to the center line are then pressed together with two fingers so that their free end areas can be inserted through the two holding openings 11 to both sides of the cable 12. The holding clip 13 is now forced by pressure on the holding area 14 into the two holding openings 11 until the cable 12 is firmly secured. Since the stop teeth 16 each locate with the two outwardly directed side edges of these two holding openings 11, location of the holding clip 13 is automatic. In the stopped condition, the holding spring 17 also presses the cable 12 against the holding plate 10. Naturally, the holding spring 17 can also be eliminated in a simpler embodiment.

Cables 12 with different diameters can be secured by the rows of stop teeth 16. In the case of cables 12 with extremely large diameters, it is of course possible to use larger holding clips 13, the plug feet 15 thereof being no longer inserted into holding openings 11 arranged next to each other but rather into holding openings that are farther apart.

In order to provide for grounding at the same time the cable 12 is secured, the cable 12 is stripped in the area of the holding clip 13 up to the metallic cable shield 19. Electrical grounding then takes place automatically when the cable 12 is secured because of the metal holding clip 13 and the metal holding plate 10. In principle, the holding plate 10 and/or the holding clip 13 could also be made of another conductive material such as electrically conductive plastic or plastic with a suitable metallic coating.

Figure 3:
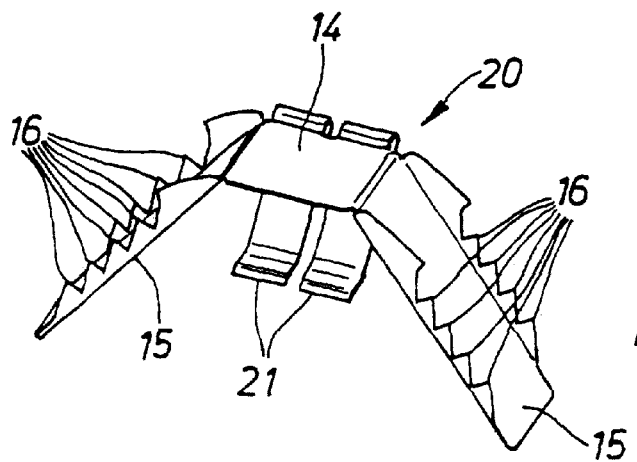
FIG. 3 is a perspective view of a modified version of the holding clip illustrated in FIGS. 1 and 2 in which a holding spring arrangement is provided.

FIG. 3 shows a modification of the holding clip shown in FIGS. 1 and 2; the area and parts that are the same or have the same effect are provided with the same reference symbols and are not described again. In distinction to the holding clip 13, the holding clip 20 shown in FIG. 3 does not have a one-piece holding spring 17 but rather a two-part holding spring 21. Since the two strips of the two-part holding spring 21 act independently of each other, two different cables can be secured at the same time with the one holding clip 20, for example. This kind of two-part holding spring 21 has its advantages also for a single cable that is not precisely centered. In principle, the holding spring 21 can also be divided into a greater number of strips.

Figure 4:
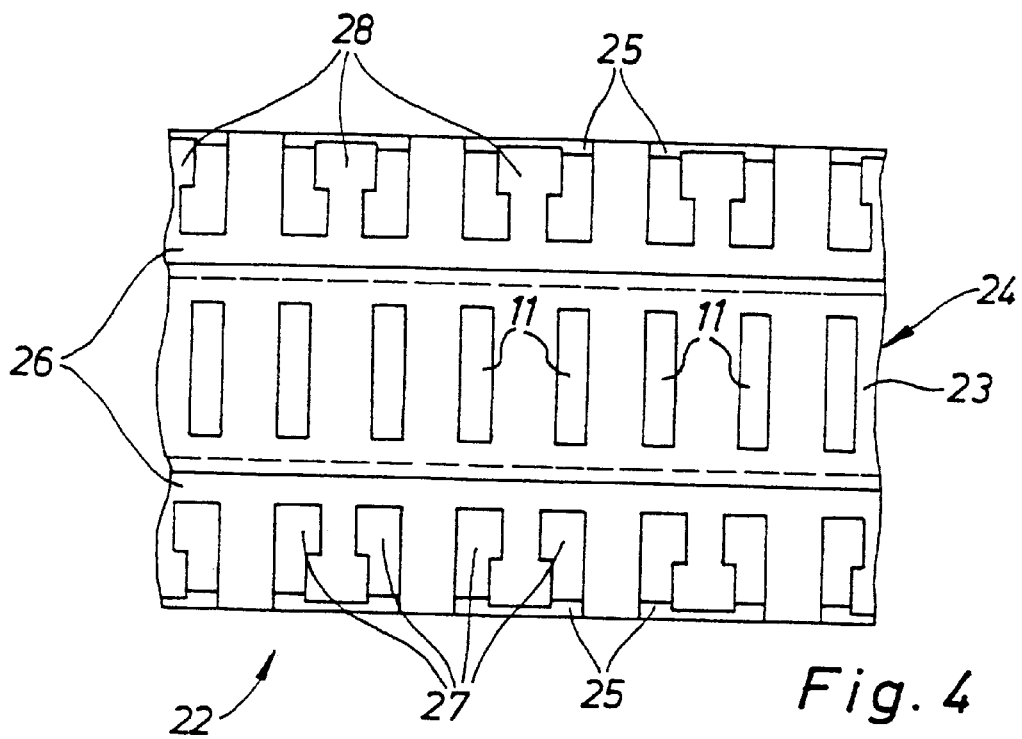
FIG. 4 is a modified version of a holding plate.
Figure 5:
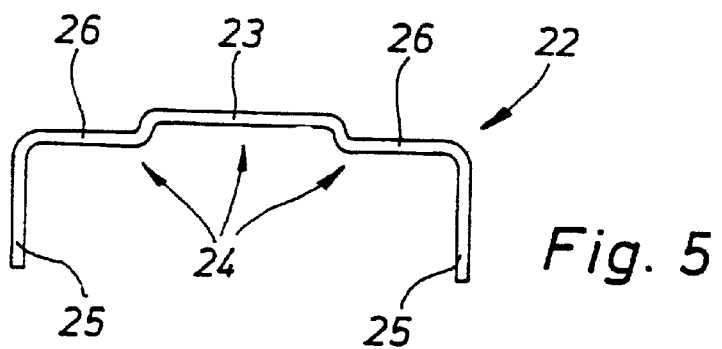
FIG. 5 is a sectional view of the holding plate illustrated in FIG. 4.

FIGS. 4 and 5 show a modification of the holding plate 10. This holding plate 22 is designed as an elongated, basically U-shaped rail. The holding openings 11 are arranged only in the middle area 23 of the connection cross-piece 24 between two strip-like U-legs 25. This middle area 23 projects relative to side areas 26 of the connection cross-piece 24 on the side of the connection cross-piece 24 opposite the legs by an amount that corresponds basically to the thickness of the insulation layer of a cable 12 to be secured. That is, the plane of the middle area 23 is displaced with respect to the plane of the side areas 26. When a cable 12 is secured by means of a holding clip 13 or 20, the cable 12 can thus run linearly transverse to the holding plate 22 in that the stripped area at the middle area 23 and the connecting non-stripped area of the cable 12 lie on the side areas 26.

The side areas 26 have stamped out areas 27 extending in part into the U-legs 25. The stamped out areas 27 thus form T-like holding elements in the plane of the side areas 26, their free ends each pointing outwardly.

The cable areas still provided with the insulating layer can be secured by means of these holding elements 28 to the holding plate 22 along with cable straps or the like.

Figure 6:
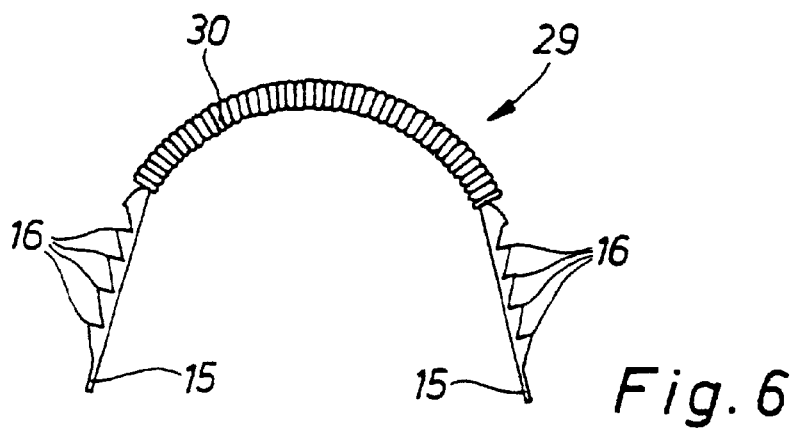
FIG. 6 is a side view of a further example embodiment of a holding clip in which the holding area is designed as a flat tension spring.

FIG. 6 shows a further modification of the holding clip 29. While the plug feet 15 correspond to those of holding clips 13 and 20, the holding area 14 is replaced by a tension spring 30 with a flat shape, the width thereof corresponding basically to that of the plug feet 15. This tension spring 30 designed as a spiral spring allows for a more variable placement on one or more cables to be secured with this holding clip 29, and even very wide cables can be engaged therewith. The length of the tension spring 30 can be adjusted to requirements or holding clips 29 can be provided that have tension springs 30 of different lengths.

Figure 7:
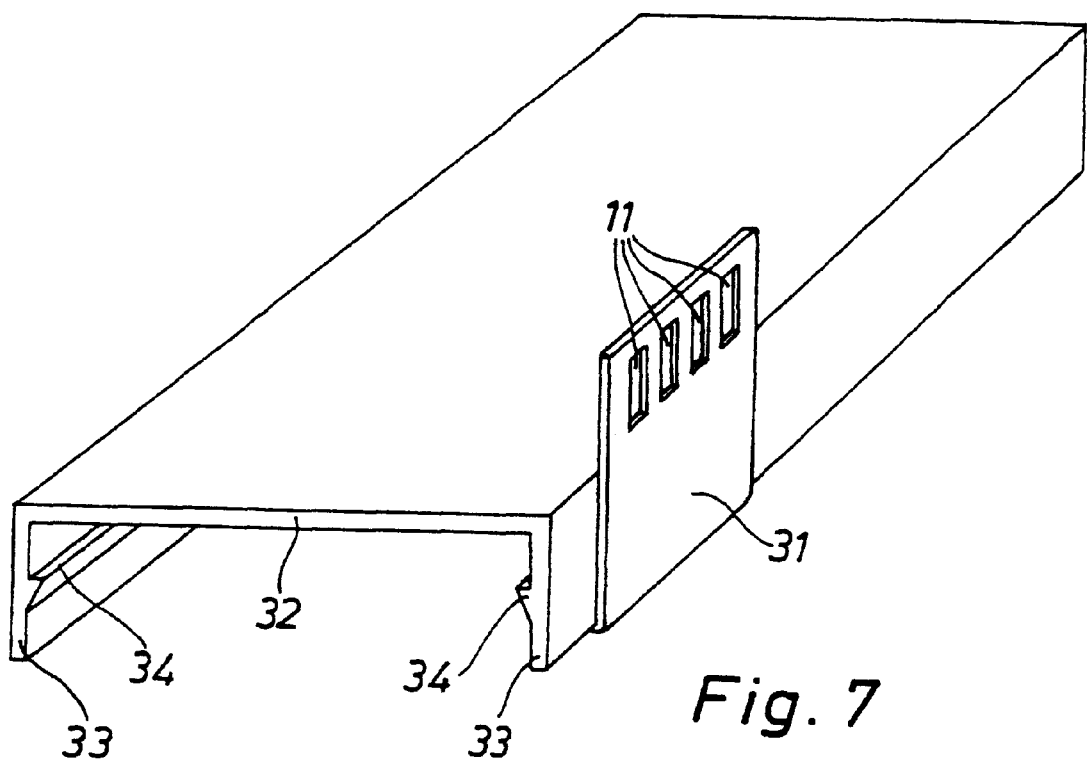
FIG. 7 is a perspective view of a further embodiment of a holding plate that can be mounted on a mounting cross-piece.
Figure 8:
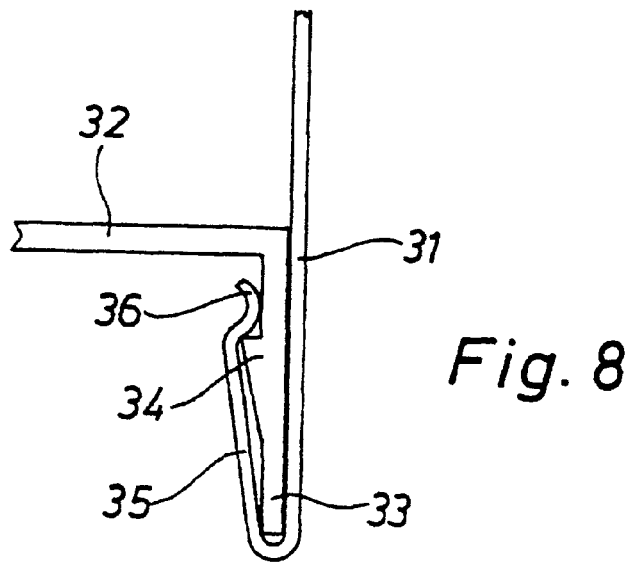
FIG. 8 is a partial front view of a detail of the arrangement illustrated in FIG. 7.

FIGS. 7 and 8 show a structural modification of the holding plate 31. Unlike the preceding embodiments, this holding plate 13 is no longer itself designed as a bearing rail, but is rather secured on an existing bearing rail or a mounting cross-piece 32 which has a U-shaped profile here. Stop strips 34 are integrally formed on the inner sides of the two U-legs 33 of this mounting cross-piece 32, as is usually the case in commercially available mounting cross-pieces.

A longitudinal side of the holding plate 31 has a bent holding area 35, which in turn has a curved stop end area 36. This holding area 35, bent basically 180 degrees, is slipped onto a U-leg 33 of the mounting cross-piece 32 so that the stop end area 36 locates with the corresponding stop strip 34. Relatively simple disengaging can be carried out for withdrawing the holding plate 31 with a suitable curvature of the stop end area 36. This holding plate 31 lies in part on the outer side of one of the U-legs 33, the holding openings 11 being arranged in the projecting area.

This kind of holding plate 31 can be relatively short, only four holding openings 11 being provided in the example embodiment. This holding plate 31 can be clipped anywhere on the mounting cross-piece 32 where a cable has to be secured. If need be, a number of holding plates 31 can thus be secured in an irregular arrangement to the mounting cross-piece 32, which has only two holding openings 11 in the simplest case. Of course, it is also possible to have elongated embodiments of holding plates 31 with very many holding openings 11. As a modification of the example embodiments of holding clips, the strip-like plug feet 15 can in principle be replaced by plug feet with other shapes such as those having a cross-section that is round or multi angular.

I claim:

1. Cable holding arrangement with a holding plate (10; 22; 31) having a plurality of similar holding openings (11) arranged next to each other in a row, with at least one holding clip (13; 20; 29) that has two opposed plug feet (15) connected with each other through a holding area (14; 30) in a normally outwardly-biased and outwardly-diverging and untensioned condition for insertion in two of the holding openings (11) and which forms a U-like arrangement in the plugged-in condition by means of which a cable (12) to be secured can be clasped and pressed onto the holding plate (10; 22; 31), the plug feet (15) having an arrangement (16) defining stop teeth disposed along said plug feet (15) for locating with the holding openings (11) by application of opposing inward pressure to the opposed plug feet (15) sufficient to overcome the normally outwardly biased and outwardly-diverging condition of the plug feet (15) and to thereby align the plug feet (15) with two spaced-apart holding openings (11) between which the cable (12) is positioned.

2. Cable holding arrangement as described in claim 1, characterized in that the holding openings (11) are designed as parallel slots.

3. Cable holding arrangement as described in claim 1, characterized in that the holding clip (13; 20; 29) is designed as a flexibly sprung arrangement, the plug feet (15) to be pressed toward each other for insertion in the two holding openings (11) being spring-mounted in the inserted condition on the most widely separated outer edges or edge areas of the two holding openings (11).

4. Cable holding arrangement as described in claim 1, characterized in that the two plug feet (15) have stop projections (16) that point in opposite directions designed for locating with the outer edges of two holding openings (11).

5. Cable holding arrangement as described in claim 4, characterized in that each plug foot (15) has at least one row of stop teeth (16) running in the plugging direction.

6. Cable holding arrangement as described in claim 5, characterized in that each plug foot (15) is designed as a metal strip on which a row of stop teeth (16) is arranged, being formed integrally, in particular, on its longitudinal edges and angled outward.

7. Cable holding arrangement as described in claim 5, characterized in that the stop teeth (16) have tooth ramps that facilitate insertion on their side pointing in the direction of insertion and tooth edges that are essentially vertical on the other side.

8. Cable holding arrangement as described in claim 1, characterized in that the holding clip (13; 20) made of sheet metal is designed as a one-piece stamped and bent part.

9. Cable holding arrangement as described in claim 8, characterized in that a holding spring arrangement (17; 21), which is flexibly held against the cable (12) to be held when the holding clip (13; 20) is in the inserted condition, is formed on the holding area (14).

10. Cable holding arrangement as described in claim 9, characterized in that the holding spring arrangement (17; 21) is designed as a metal strip in one or more parts which is integrally formed on the holding area (14) and which extends from one edge of the holding area (14) along the underside of the holding area (14) pointing in the inserted condition toward the holding plate (10; 22; 31).

11. Cable holding arrangement as described in claims 1, characterized in that the holding area (30) is designed as a tension spring.

12. Cable holding arrangement as described in claim 11, characterized in that the holding area (30) designed as a tension spring has a flat shape.

13. Cable holding arrangement as described in claim 1, characterized in that the holding plate (10; 22) has a U-shaped cross-section, the holding openings (11) being arranged on the connection cross-piece (24) between the strip-like U-legs (25).

14. Cable holding arrangement as described in claim 13, characterized in that the holding openings (11) are arranged in the middle area (23) of the connection cross-piece (24) and in that holding elements (28) with a T-shape in particular are formed out on the two side areas (26) of the connection cross-piece (24).

15. Cable holding arrangement as described in claim 14, characterized in that, with respect to the plane of the two side areas (26), the plane of the middle area (23) is offset toward the side facing away in front of the U-legs (25).

16. Cable holding arrangement as described in claim 1, characterized in that the holding plate (31) is provided on one side with a mount (35) for clamping attachment on a mounting cross-piece (32) on the opposite side with the holding openings (11).

17. Cable holding arrangement as described in claim 16, characterized in that the mount (35) is designed as a bent over end area of the holding sheet (31).

18. Cable holding arrangement as described in claim 16, characterized in that the mount (35) for clamping location is designed with a stop strip (34) arranged in particular on a U-leg (33) of the bearing rail or of the mounting cross-piece (32).

19. Cable holding arrangement as described in claim 1, characterized in that the holding plate (10; 22; 31) and at least one holding clip (13; 20; 29) consist at least in part of an electrically conductive material, especially metal.

20. Cable holding arrangement with a holding plate (10; 22; 31) having a plurality of similar holding openings (11) arranged next to each other in a row, with at least one, one-piece stamped and bent sheet metal holding clip (13; 20; 29) that has two opposed plug feet (15) connected with each other through a holding area (14; 30) for insertion in two of the holding openings (11) and which forms a U-like arrangement in the plugged-in condition by means of which a cable (12) to be secured can be clasped and pressed onto the holding plate (10; 22; 31), the plug feet (15) having an arrangement (16) for locating with the holding openings (11), wherein a holding spring (17;21) is provided which is flexibly held against the cable (12) to be held when the holding clip (13; 20) is in the inserted condition, is formed on the holding area (14), and further wherein said holding spring (17; 21) is designed as a metal strip in at least one part which is integrally-formed on the holding area (14) and which extends from one edge of the holding area (14) along the underside of the holding area (14) pointing in the inserted condition toward the holding plate (10; 22; 31).

\* \* \* \* \*

UNITED STATES PATENT AND TRADEMARK OFFICE
CERTIFICATE OF CORRECTION

PATENT NO. : 6,216,320 B1
DATED : April 17, 2001
INVENTOR(S) : Schauermann

Page 1 of 1

It is certified that error appears in the above-identified patent and that said Letters Patent is hereby corrected as shown below:

Claim 3,
Line 1, delete "claim 1" and insert -- claim 1 or 2 --.

Claim 4,
Line 1, delete "claim 1" and insert -- one of the foregoing claims --.

Claim 7,
Line 1, delete "claim 5" and insert -- claim 5 or 6 --.

Claim 8,
Line 1, delete "claim 1" and insert -- one of the foregoing claims --.

Claim 11,
Line 1, delete "claim 1" and insert -- claims 1 to 7 --.

Claim 13,
Line 1, delete "claim 1" and insert -- one of the foregoing claims --.

Claim 16,
Line 1, delete "claim 1," and insert -- one of claims 1 to 12 --.

Claim 18,
Line 1, delete "claim 16", and insert -- claim 16 or 17 --.

Claim 19,
Line 1, delete "claim 1" and insert -- one of the foregoing claims --.

Signed and Sealed this

Nineteenth Day of February, 2002

Attest:

JAMES E. ROGAN
*Attesting Officer*     *Director of the United States Patent and Trademark Office*